May 18, 1943.  J. K. OSTRANDER  2,319,625
VARIABLE SPEED MOTOR SYSTEM
Filed Aug. 28, 1937   2 Sheets-Sheet 1

WITNESSES:
Leon M. Garman
S. A. Stricklett

INVENTOR
John K. Ostrander.
BY O. B. Buchanan
ATTORNEY

May 18, 1943.   J. K. OSTRANDER   2,319,625
VARIABLE SPEED MOTOR SYSTEM
Filed Aug. 28, 1937   2 Sheets-Sheet 2

WITNESSES:
Leon M. Garman
S. A. Strickler

INVENTOR
John K. Ostrander.
BY O. D. Buchanan
ATTORNEY

Patented May 18, 1943

2,319,625

UNITED STATES PATENT OFFICE 2,319,625

VARIABLE SPEED MOTOR SYSTEM

John K. Ostrander, Philadelphia, Pa.

Application August 28, 1937, Serial No. 161,407

10 Claims. (Cl. 172—274)

My invention relates to a variable speed motor system, and particularly to an alternating-current motor variable over a wide range of speed.

In the application of motor drives, it is frequently desirable to operate the motor over a wide range of speed. Heretofore, it has been customary to provide direct-current motors with some kind of conversion system when it is desired to operate the motor over a wide range of speed from an alternating current system. Because of the ruggedness and simplicity of induction type alternating-current machines, it would be desirable to replace the direct-current machines with this more practical, rugged and less expensive type of drive. However, the heretofore existing control systems for utilizing an induction motor with speed regulated characteristics comparable to that of a direct-current motor have been expensive, inefficient and unreliable.

The motor system according to my invention comprises a wound rotor induction motor having a direct-current motor coupled in driving connection therewith, and means for connecting the output current of the wound rotor to the direct-current motor. In order to utilize the alternating-current output of the wound rotor, the output current is put through a suitable rectifying device, preferably a valve type rectifier, and supplied to the direct-current motor as direct current.

In order to control the speed at which the wound rotor induction motor operates, it is necessary to control the amount of current flowing in the secondary or rotor winding. In order to accomplish this, I have provided the rectifying device with suitable control electrodes and means for controlling the potential applied to the electrodes, so that any desired amount of current can be drawn from the secondary winding in order to control the speed at any desired value. Since the current drawn from the alternating-current machine is rectified and supplied to the direct-current machine, practically no loss is encountered because of the variable current drawn from the secondary of the induction machine.

It is, accordingly, an object of my invention to provide an alternating-current motor of the induction type which is operable over a wide range of speed.

It is a further object of my invention to provide a motor drive system in which a direct-current motor is supplied with current from the rotor of a wound rotor induction motor by means of a controlled rectifying device.

It is a further object of my invention to provide a motor drive system in which the speed may be regulated at will to any speed over a wide speed range.

It is a further object of my invention to provide a variable speed motor system having high efficiency over the entire speed range.

It is a still further object of my invention to provide a motor regulating system which automatically maintains motor speed constant at any selected speed.

Other objects and advantages of my invention will be apparent from the following detailed description, taken in conjunction with the accompanying drawings, in which.

Figure 1:
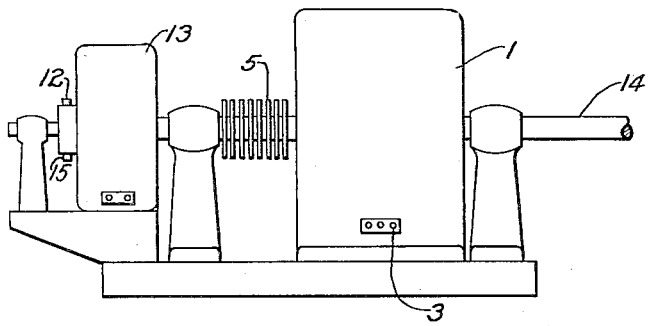
Figure 1 is an elevational illustration of the manner of connecting the motors of my system.
Figure 2:
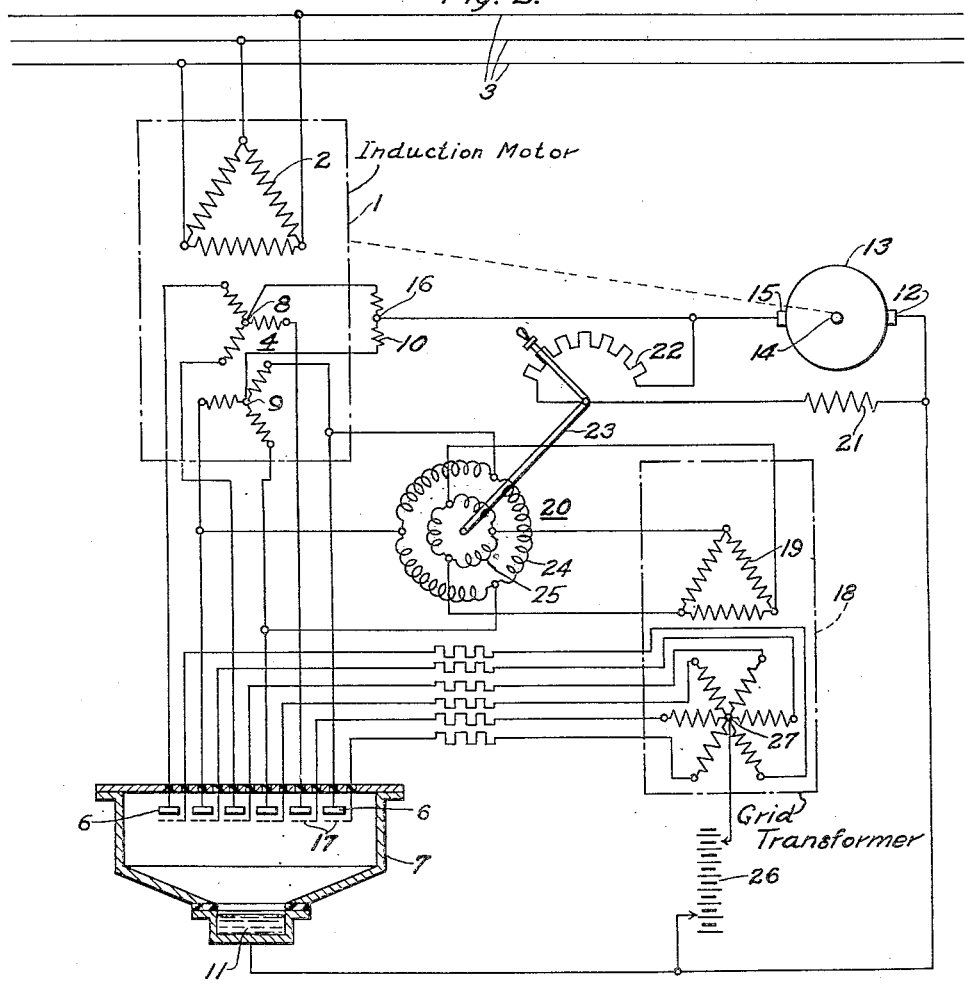
Fig. 2 is a schematic illustration of a motor drive system according to my invention.

In the illustrative embodiment of my invention according to Figs. 1 and 2, a wound rotor induction motor 1 having an inducing winding 2 connected to a suitable source of alternating-current power 3 and an induced winding 4 having terminal connections brought out through suitable means such as the slip rings 5 and connected to the anodes or valves 6 of a suitable valve type converter 7. As illustrated the induced winding 4 is composed of two star-connected groups 8 and 9 interconnected by means of a suitable inter-phase transformer 10 as is customary in double three-phase rectifier transformers. The cathode connection 11 of the rectifying device 7 is connected to one terminal 12 of a suitable direct-current motor 13 which is preferably mounted directly on the driving shaft 14 of the induction motor 1, so that both the alternating-current motor 1 and the direct-current motor 13 cooperate to drive a suitable load (not shown). The other terminal 15 of the direct-current motor is connected to a mid-tap position 16 in the inter-phase transformer 10.

In order to control the speed of the motor system, each valve 6 of the rectifying device 7 is provided with a suitable control electrode, herein illustrated as grids 17. However, it is obvious that any suitable type of valves, such as ignitrons, could be substituted for the multiple anode rectifier of my illustrative embodiment.

The control electrodes 17 are supplied with control potential by means of a suitable control transformer 18, the primary 19 of which is connected to the output terminals of the induced winding 4 of the induction motor 1. Between the terminals of the induction motor 1 and the primary 19 of the control transformer 18 is placed a suitable phase-shifting device, herein illustrated as a rotary phase shifter 20 of the induction type having a stator 24 and a rotor 25.

The direct-current motor 13 is provided with a suitable shunt field winding 21, the excitation current of which is controlled by means of a suitable resistor 22. Preferably the contact arm 23 of this field control resistor 22 is directly connected to the rotor 25 of the induction phase shifter 20, so that the motor excitation and the phase relation of the control system are simultaneously adjustable. If desired, a suitable bias, herein shown as a battery 26, may be inserted between the cathode 11 of the rectifying device 7 and the return connection 27 of the control transformer 18.

In the operation of the motor system according to this embodiment, the alternating-current source 3 is connected to the inducing winding 2 of the induction motor 1 which induces a potential in the induced winding 4 which is applied to the anodes 6 of the rectifying device 7. Since the motor 1 is at a standstill the induced potential will be of substantially the same frequency as the alternating-current source 3. The rectifying device 7 will pass current to the direct-current motor 13, the amount of the current flowing determining the starting torque of the induction motor 1. At the same time, the current flowing from the rectifying device 7 through the direct-current motor 13 supplies a starting torque to the direct-current motor 13. As the alternating-current motor 1 comes up to speed, its frequency decreases but as the control system is directly connected to the output frequency, the phase relation of the control electrodes 17 of the rectifying device 7 will remain substantially constant with respect to the phase relation applied to the valves 6, so that, depending upon the setting of the rotary phase shifter 20, the system will operate at any speed up to the maximum speed of the induction motor 1.

Assuming that the induction motor 1 is operating at maximum speed, that is, with the rotary phase shifter 20 in zero phase shift position, so that the anodes 6 deliver current during the entire interval that positive potential is applied thereto and the field control 22 of the direct-current motor will be at its lowest position, that is, the position of greatest speed of the direct-current machine, to change this speed the phase shifter 20 is shifted through an angular position to retard the phase position of the potentials applied to the control electrodes 17 with respect to the potentials supplied by the induced winding 4, so that the current drawn from the induced winding 4 is decreased. At the same time, the control resistor 22 will be varied to increase the exciting current of the direct-current machine 13 and thereby reduce the speed of the direct-current machine 13 simultaneously with reduction of the speed of the wound rotor machine 1.

Figure 3:
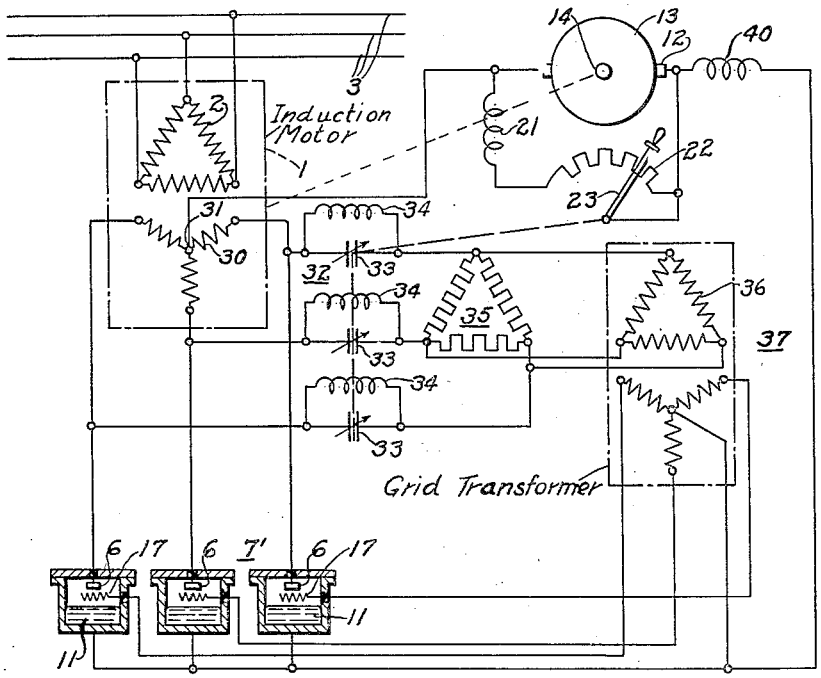
Fig. 3 is a schematic illustration of a modification according to my invention; and, Fig. 4 is a schematic illustration showing further modifications according to my invention.

In the modification of my invention as illustrated in Fig. 3, the double three-phase induced winding 4 of the induction motor 1 has been replaced by a three-phase winding 30, the neutral point 31 of which is connected to one terminal 15 of the direct-current motor 13 and the phase terminals of which are passed through a suitable rectifying device 7' and connected to the other terminal 12 of the direct-current motor 13.

The phase shifting device herein illustrated comprises an impedance network 32 having a capacitor 33 and a reactance 34 connected to a resistance type load 35 in such manner that the current drawn is substantially constant, the voltage drop across the resistors 35 being applied to the primary winding 36 of a suitable control transformer 37 which supplies potential to the control electrodes 17 of the rectifying device 7'. By changing the ratio of one or both of said impedance devices 33 or 34, the phase relation of the potential impressed upon the control transformer 37 and thereby the phase relation of the potentials impressed on the control electrodes 17 may be controlled.

Furthermore, this phase control network is automatically responsive to change in speed so that it maintains the motor at any given speed adjustment.

The phase shifter network 32 is tuned so that it is in resonance at any predetermined slip frequency or frequency of the rotor output corresponding to a given motor speed. If the slip frequency increases, indicating a slowing down of the motor 1, the reactive impedance 34 draws less current while the capacitive impedance 33 draws more current, so that, the effect is to impress a more leading current on the control transformer 37 which advances the phase relation of the potential impressed on the control electrodes 17 so that the grid is released earlier in the cycle, thus speeding up the motor system. On the other hand, if the slip frequency decreases the reactive impedance 34 becomes more effective and the capacitive impedance 33 becomes less effective, thus retarding the firing angle and slowing the motor combination Assuming that the motor has been adjusted to a suitable speed and that the load should change, for instance, by being decreased so that the induction motor 1 tends to increase its speed and thereby decrease the frequency at the terminal of the induced winding 30, the decreased frequency will act upon the phase-shifting network 32 to supply a lagging potential to the control transformer 37 which causes the rectifier 7' to become active at a later time in the conducting period, so that less current is drawn from the secondary winding 30 of the induction motor 1 and thereby reduces the speed to the value originally determined by the phase shifter network 32. On the other hand, if the load should increase, retarding the speed of the induction machine 1, the frequency of the potential in the induced winding 30 would be increased and because of the capacity component of the network 32, the phase angle of the control potential would be advanced so that larger currents would be drawn from the induced winding 30, thereby increasing the speed to the value originally determined.

Figure 4:
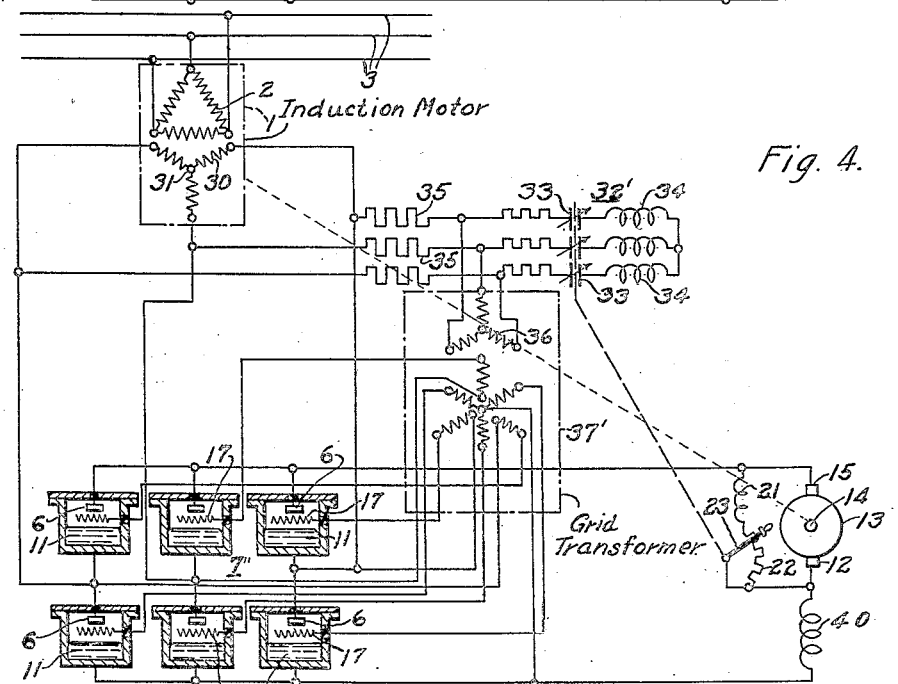

Instead of connecting the direct-current circuit to a neutral point in the induced winding 30, a full wave three-phase rectifier 7'' may be connected across the terminals of the induced winding 30, as shown in Fig. 4, so that a complete rectified current is supplied to the direct-current machine 13 without the necessity of a return connection to the motor winding 30. This connection has a further advantage in that the induced winding 30 at all times carries alternating current instead of pulsating direct current and the size of the induction machine 1 may be, accordingly, materially reduced, for the most favorable condition the reduction in size being approximately 40%.

The full wave rectifier 7'' is likewise controlled by means of suitable control electrodes 17 supplied with potential from a suitable control transformer which may be fed either by a rotary phase shifter or by suitable impedance networks 32'.

Since the cathodes of the full wave rectifier 7'' are at different potentials, the control transformer 37' must be composed of a plurality of independent windings instead of a star-connected winding, as is shown in the previous modifications. If desired, the direct-current motor 13 may be provided not only with a shunt field winding 21 but with a series field winding 40 in order that the motor 13 be more responsive to change of current produced by the rectifying device 7''. This series exciting winding 40 may be either positively or differentially wound according to the characteristics of the direct-current machine 13.

While for purposes of illustration I have shown and described specific embodiments of my invention, it will be apparent that changes and modifications can be made therein without departing from the true spirit of my invention or the scope of the appended claims.

I claim as my invention:

1. A variable speed motor system comprising an induction motor, a three-phase primary winding in said motor, a double three-phase secondary winding in said motor, a direct-current motor in driving connection with said induction motor, circuit means interconnecting said secondary winding and said direct-current motor, electric valve means interposed in said circuit means in such manner as to cause the flow of direct current therein, control electrodes associated with said valve means, connections for applying potential from said secondary winding to said control electrodes, phase-shifting means interposed in said connections for controlling the current supplied to said direct-current motor from said secondary winding, an exciting winding in said direct-current motor, control means for said exciting winding, and means for simultaneously operating said phase shifter and said control means.

2. A variable speed motor drive comprising an induction motor, a direct-current motor, said motors being mechanically coupled together, a primary winding in said induction motor, a secondary winding in said induction motor, a connection for connecting said secondary winding to said direct-current motor, a plurality of electric valves in said connections, control electrodes associated with said valves, means for applying control potentials to said electrodes from said secondary winding, phase shifter means for shifting the phase of the control potentials for controlling the current drawn from said secondary winding, a field winding in said direct-current motor, means for controlling current flow in said field winding, and means for simultaneously operating said phase shifter and said field controller.

3. A variable speed motor drive comprising a wound rotor induction motor, the winding of said wound rotor having a neutral connection and a plurality of phase winding terminal connections, a grid-controlled rectifier connected to said phase terminals, a direct-current motor connected between the rectifier and the neutral connection of the winding of said induction motor, both said motors being mechanically connected to drive the same load, means for controlling the field current of said direct-current motor, means for applying the control potential from the winding of the wound rotor to said grid-controlled rectifier, means for simultaneously actuating said field control means and said potential applying means, and means for maintaining the adjustment of said field control means and said potential applying means at any given setting.

4. A variable speed motor system comprising a wound rotor induction motor, a direct-current motor in driving connection therewith, circuit means interconnecting the rotor winding of said induction motor with said direct-current motor, a valve type converter interposed in said circuit means, control electrodes associated with said converter, a control circuit for applying potentials from said rotor winding to said control electrodes, an impedance network interposed in said control circuit for determining the phase relation of the control potentials applied to said control electrodes, said network being adjustable to control the speed of said induction motor, a plurality of exciting windings in said direct-current motor, at least one of said exciting windings being adjustable to vary the speed of said direct current motor, and means for simultaneously adjusting said exciting winding with adjustment of said impedance network.

5. A variable speed motor drive comprising a wound rotor induction motor, a direct-current motor, said motors being mechanically connected to drive a common load, a primary winding in said induction motor, a secondary winding in said motor, phase terminal connections for said secondary winding, a neutral connection for said secondary winding, a plurality of vapor-electric valves connected to said phase terminals, control electrodes in said valves, said direct-current motor being connected between said valves and said neutral connection, a control resistor for the field of said direct-current motor, means for applying control potentials to said control electrodes from said secondary winding, and means for simultaneously adjusting said control resistor and said potential applying means.

6. A speed control system comprising an induction motor, a primary winding in said motor, a secondary winding in said motor, a direct-current motor having driving connection with said induction motor, circuit means interconnecting said secondary winding and said direct-current motor, electric valve means interposed in said circuit means in such manner as to cause the flow therethrough of direct-current, control electrodes associated with said valve means, connections for supplying control potential to said control electrodes from said secondary winding, phase-shifting means interposed in said connections for controlling the speed of said induction motor, a field winding in said direct-current motor, control means for controlling the exciting current in said field winding, and means for simultaneously operating said phase shifter and said control means.

7. A variable speed motor system comprising an induction motor, a direct-current motor in driving connection therewith, a primary winding in said induction motor, a secondary winding in said induction motor, circuit means interconnecting said secondary winding and said direct-current motor, electric valve means interposed in said circuit means in such manner as to cause the flow of direct current to said direct-current motor, control electrodes associated with said electric valves, circuit means including a control transformer for supplying control potential from said secondary winding to said control electrodes, an impedance network phase shifter interposed in said circuit means, said phase shifter comprising a reactor and a capacitor in series with each phase of said circuit means, a load resistor, and means for tuning each of said impedances for resonance at any predetermined frequency.

8. A variable speed motor drive comprising a source of alternating current, a wound rotor induction motor having a primary winding connected to said source, a rotor winding having a neutral connection and a plurality of phase terminals, a multivalve rectifier connected to the phase terminals, control grids for said electric valves, means energized from said wound rotor for supplying control potential to said control grids, means for shifting the phase of the control potentials for varying the current drawn from the wound rotor, a direct current motor mechanically coupled to said induction motor, a connection for supplying the output of the rectifier to said direct current motor, a field winding for said direct current motor, means for varying the field current of said direct current motor, and means for simultaneously actuating the phase shifting means and the field current.

9. In combination, an alternating current circuit, an induction motor having inducing and induced windings, said inducing winding being connected to said circuit, a dynamo-electric machine of the direct current type having armature and excitation circuits, electric valve means connected between said induced winding and said armature circuit and including control means for controlling the conductivity thereof, and means for controlling simultaneously the energization of said excitation circuit and said control means to control the power transfer between said induced winding and said direct current machine.

10. In combination, an alternating current circuit, an induction motor having inducing and induced windings, said inducing winding being connected to said circuit, a dynamo-electric machine of the direct current type having armature and excitation circuits, electric valve means connected between said induced winding and said armature circuit and including control means for controlling the conductivity thereof, a control circuit for impressing on said control means a periodic voltage, means for controlling the energization of the excitation circuit, and means for controlling simultaneously the energization of said excitation circuit and the phase of said periodic voltage to control the speed of said induction motor from standstill to synchronous speed.

JOHN K. OSTRANDER.